Patented Nov. 10, 1931

1,830,904

UNITED STATES PATENT OFFICE

HARRISON P. HOOD, OF CORNING, NEW YORK, ASSIGNOR TO CORNING GLASS WORKS, OF CORNING, NEW YORK, A CORPORATION OF NEW YORK

ULTRA VIOLET TRANSMITTING GLASSES AND METHOD OF MAKING THE SAME

No Drawing.    Application filed November 2, 1927.   Serial No. 230,683.

This invention relates to the art of ultraviolet transmitting glasses, and more particularly to the production of ultraviolet transmitting glasses having permanent high ultraviolet transmission.

For many purposes, such as the treatment of rickets, it is highly desirable to subject the patient to ultraviolet radiation, but owing to the practical impossibility of remaining out of doors for sufficiently long periods of time, and the fact that the ultraviolet rays are absorbed in passing through ordinary window glass, many attempts have been made to produce glasses which will transmit a large percentage of the ultraviolet radiation reaching them.

It has been found, however, that many glasses which originally allowed a large percentage of the beneficial rays to pass gradually lost their power of transmission, upon continued exposure to ultraviolet radiation, until they were so largely absorptive of these rays that they were of little or no value for their intended purpose.

I have found that glasses having permanent high transmission of ultraviolet radiation can be produced by decreasing the total iron and titanium contents in the batch materials to an extremely low figure and then melting the batch under conditions such that substantially all of the remaining iron is kept in the ferric state.

It is therefore an object of this invention to provide ultraviolet transmitting glasses which have permanent high ultraviolet transmission, and to provide a method of producing same.

In my prior application Serial Number 226,515, filed October 15, 1927, I have disclosed a large series of ultraviolet transmitting glasses and a method of making same which consists in decreasing the total iron and titanium contents to a very low figure and then reducing substantially all of the remaining iron to the ferrous condition.

When I learned that ultraviolet transmitting glasses of widely varying types lost their transmitting power upon long-continued exposure to ultraviolet radiation, I conceived the idea that this was due to an oxidation of the ferrous iron by the breaking up of some of the ferrous oxide into colloidal iron and oxygen, and that the latter combined with remaining molecules of ferrous oxide to form ferric oxide. I also conceived the idea that ferric oxide is slightly decomposed into colloidal iron and oxygen, which may or may not be combined with some other materials in the glass. This was thought to be a reversible reaction which is shifted into an unstable condition by means of ultraviolet radiation, thus causing something equivalent to a strained condition in the glass. It then occurred to me that if the glass was heated to a high enough temperature to allow a motion of the molecules, so that they could assume their nature equilibrium, the property of ultraviolet transmission would be restored, and upon experimentation I found this to be the case, as fully disclosed and claimed in my prior application Serial Number 226,516, filed October 15, 1927.

From the above I concluded that instead of relying on keeping the ferric iron below certain percentages, by reduction to the ferrous condition, it would be necessary, if permanent high ultraviolet transmission is desired, to have practically all of the iron in the ferric condition and to keep the total iron as low as that stated in my said prior application, Serial Number 226,515, for ferric iron in order to obtain the initial percentage transmissions indicated therein. This can be accomplished by the proper choice and purification of batch making materials. As indicated below, the permanent transmission values will be slightly lower than the initial ones.

As a demonstration of this, I made a series of melts of glasses in which the total iron in the batch materials was decreased to approximately 0.003 of one per cent and in which the titanium was decreased to approximately 0.006 of one per cent. Sodium nitrate was added to the batch to make certain that substantially all of the remaining iron was in the oxidized condition, so that there would be too small a residual amount of ferrous iron in the glass to appreciably reduce its ultraviolet transmission if it was converted into ferric iron by ultraviolet radiation.

As specific examples of glasses I have made, and to which this invention is applicable to obtain permanent high ultraviolet transmission, the following are given:

|  | I | II | III | IV |
|---|---|---|---|---|
|  | Per cent | Per cent | Per cent | Per cent |
| $SiO_2$ | 75 | 70 | 75 | 74 |
| $B_2O_3$ | 0 | 10 | 0 | 6 |
| $Na_2O$ | 15 | 10 | 15 | 15 |
| ZnO | 5 | 5 | 0 | 4 |
| CaO | 4 | 4 | 10 | 0 |
| $Al_2O_3$ | 1 | 1 | 0 | 1 |

The silica used in all the above batches was an especially pure grade of silica, that actually used being a vein quartz. This was purified by the use of hydrochloric acid, although this can be done by the use of other materials, such as other acids, or by the use of suitable non-acid chlorine containing materials, such as phosgene.

The other materials used in the above batches were also low in objectionable impurities either as obtained or as a result of special purification.

All of the glasses indicated above possessed an initial transmission of at least 80% at 302 millimicrons in 2 mm. thicknesses, and glass I transmitted as high as 88%, both transmissions being uncorrected for surface reflection. These transmission values of glasses I and IV were obtained by measurements made by the method described in the Journal of the Optical Society of America, vol. 7, #6, 1923, page 439. This method uses a quartz mercury arc as a light source, a quartz monochrometer, a vacuum thermopile and a Thompson galvanometer. The thermopile was arranged to fall on the various mercury lines as desired. A series of five or ten galvanometer deflections for a line of the given wave length was obtained with no glass in the light path, and then a similar set of readings was taken with the glasses to be measured placed between the light source and the slit of the monochrometer. The average of the latter readings divided by the average of the former gave the transmission of the glass for the particular line in question. The transmission values of glasses II and III were determined photographically by means of a quartz spectograph.

It has been found that the commercial glasses which have shown a marked loss of transmission in a few months' exposure to sunlight show a similar loss of transmission in a few hours' exposure to the quartz mercury arc, and that in this period the transmission value drops in some cases to less than one-half of its original value. Hence it seems fair to conclude that exposure to the radiation from a quartz mercury arc is a suitable accelerated method of testing the loss of ultraviolet transmission on exposure to sunlight. Indeed the mercury arc is more severe in causing deterioration than the sunlight in that it contains waves of shorter length than are contained in the sunlight, which waves have their own effect in causing deterioration.

To determine the reaction of the glasses of this invention, as well as certain commercial glasses, to prolonged exposure to ultraviolet radiation, they were therefore subjected for varying periods of time to the radiation from a quartz mercury arc. The transmission of glass IV, after exposure for two (2) hours to the quartz mercury arc, was measured in the manner pointed out above, and it was found that the transmission had dropped slightly, namely to approximately 68% at 302 millimicrons in 2 mm. thicknesses, but that no further loss of transmission occurred on prolonged exposure, even when it was carried to the extent of forty-two (42) hours. Glass I, after exposure for ninety-seven (97) hours to the quartz mercury arc, was measured in the manner pointed out above and it was found that the transmission had dropped slightly, namely to approximately 68% at 302 millimicrons in 2 mm. thicknesses. Glasses II and III were exposed for two (2) hours to the quartz mercury arc and spectograms of their transmission were taken which indicated that their transmissions had also dropped to approximately the same value as that for glasses I and IV. This loss in transmission is believed to be due to the formation of small quantities of colloidal iron, which is indicated by the fact that the glass develops an amber tint on exposure to the ultraviolet radiation, and not to the reoxidation of ferrous iron, as appears to be the case in the commercial glasses tested.

It was found that pieces of this glass whose transmission had dropped to 68% could be revivified and brought back to the original transmission by heating for short periods of time to temperatures approximating the annealing point of these glasses. This reheating also restored the original color to these glasses.

Inasmuch as glasses formed as set forth above maintain an ultimate transmission of 68%, even after long-continued exposure to ultraviolet radiation at 302 millimicrons in 2 mm. thicknesses, it will be apparent that I have developed new and useful ultraviolet transmitting glasses which possess permanent high ultraviolet transmission, and that I have also developed a new and useful method of making the same.

I have found that the presence of boric oxide in the glass decreases the slight difference between its original transmission and its permanent transmission after long-continued exposure to ultraviolet radiation.

I have also found that in barium glasses the loss of transmission is more marked than in lime or zinc glasses, and that the visible coloring is also greater in barium glasses.

The transmission curves indicated in my earlier application, Serial Number 226,515 referred to above, show that an original transmission of 70% at 302 millimicrons in 2 mm. thicknesses can be obtained by keeping the ferric oxide impurities as low as 0.006 of one per cent and the titanium impurities as low as 0.025 of one per cent in silicate glasses which do not contain boric oxide, and by tolerating slightly less of each of these impurities as the boric oxide content is increased. Glasses made of batch materials containing these impurity limits, if melted under oxidizing conditions, are within the scope of the present application and result in glasses whose permanent ultraviolet transmission, uncorrected for surface reflection, is greater than 30% at 302 millimicrons in 2 mm. thicknesses. If the resulting glass contains less than 0.005 of one per cent of total iron and less than 0.008 of one per cent of titanium, however, a permanent ultraviolet transmission of over 50%, at 302 millimicrons in 2 mm. thicknesses, is obtained.

It will be apparent that if the initial iron content of the raw materials, particularly of the silica, is sufficiently low, for example less than 0.010 of one per cent, the batch may be melted under neutral conditions, with the result that most of the iron will be in the ferric condition, and hence there will be only a very small portion which could be converted into the ferric condition on appreciable exposure to ultraviolet radiation, with a consequently small loss of the transmission it possessed originally.

It will be obvious that if the iron contents indicated herein are increased, within reasonable limits, and the titanium contents are correspondingly decreased, and vice versa, the same transmission will still be obtained. Hence it will be understood that, in my specification and claims, where I have stated both the allowable iron and titanium contents for a single glass, the stated iron and titanium contents are the equivalent of the resulting iron and titanium contents when one of these impurities has been increased and the other has been correspondingly decreased.

By "glass" I means products of this type containing at least three elements in substantial proportions, and excluding what is known as "fused quartz".

By "ferric oxide" I mean actual ferric oxide, whereas "iron" or "total iron" cover total iron calculated as ferric oxide, which is the usual method of reporting the iron content.

By "titanium" I mean all the titanium present calculated as titanium dioxide.

By "under oxidizing conditions" I mean melting a bath containing materials which are designed to assure substantially all of the iron being in the ferric state, or melting a batch under conditions which will produce a similar result.

By "permanent high ultraviolet transmission", as used herein, I mean glasses whose ultraviolet transmission at 302 millimicrons, in thicknesses of 2 mm., uncorrected for surface reflection, does not fall below 30%, even after exposure to ultraviolet radiation equivalent to that of a new quartz mercury arc lamp for a period of forty-two (42) hours. This exposure should be made at a distance of six (6) inches from a mercury arc operating on seventy-five (75) to eighty (80) volts and consuming four and one half (4½) to five (5) amperes. "A new quartz mercury arc lamp" is used as a standard of comparison because it is known that the quartz envelope of such lamps also loses a portion of its ultraviolet transmitting characteristics upon long-continued exposure to the ultraviolet radiation; because the intensity of the ultraviolet radiation from sunlight varies greatly from one location to another and from one time of the year to another and is so much less than that of a quartz mercury arc lamp; and also because a quartz mercury arc lamp transmits a large amount of ultraviolet radiation shorter than 290 millimicrons which does not reach the earth in the sun's radiation. Consequently a glass which will not lose its transmission upon exposure to the radiation of a new quartz mercury arc lamp, operated under the conditions stated above, will certainly not lose its transmission upon exposure to sunlight.

Although I have herein set forth certain specific glasses embodying my invention, and have indicated the original and ultimate transmissions of these typical glasses, I do not wish to be restricted thereto except as indicated by the scope of the following claims. I also desire to have it understood that glasses embodying my invention are equally applicable for use as windows and as enclosures for various other light sources emitting ultraviolet radiation.

In my other application, Serial No. 307,395, filed September 21, 1928, I am making claims generic to the matters herein disclosed, the claims in this case being limited either to the process of melting the described glasses under oxidizing conditions, or to glasses in which substantially all of the iron present is in the ferric state.

I claim:

1. The method of making ultraviolet transmitting glasses which consists in decreasing the iron contents of batch materials, which are otherwise suitable for the production of ultraviolet transmitting glasses, to less than 0.010 of one per cent, and melting these batch materials under oxidizing conditions.

2. The method of making ultraviolet transmitting glasses which consists in decreasing the iron and titanium contents of batch materials, which are otherwise suitable for the production of ultraviolet transmitting glasses, to 0.005 of one per cent and 0.008 of one per cent, respectively, and melting these batch materials under oxidizing conditions.

3. The method of making ultraviolet transmitting glasses which consists in decreasing the iron and titanium contents of batch materials, which are otherwise suitable for the production of ultraviolet transmitting glasses, to 0.003 of one per cent and 0.006 of one per cent, respectively, and melting these batch materials under oxidizing conditions.

4. The method of making ultraviolet transmitting glasses which consists in decreasing the iron to 0.010 of one per cent in a mixture of batch materials such as will produce a glass containing 74% of silica, 6% of boric oxide, 15% of soda, 4% of zinc and 1% of alumina, and melting these batch materials under oxidizing conditions.

5. The method of making ultraviolet transmitting glasses which consists in decreasing the iron to 0.003 of one per cent and the titanium to 0.006 of one per cent in a mixture of batch materials such as will produce a glass containing 74% of silica, 6% of boric oxide, 15% of soda, 4% of zinc, and 1% of alumina, and melting these batch materials under oxidizing conditions.

6. A glass having permanent high ultraviolet transmission and containing less than 0.005 of one per cent of total iron and less than 0.008 of one per cent of titanium, substantially all of the iron present being in the ferric state.

7. A glass having permanent high ultraviolet transmission and containing less than 0.003 of one per cent of total iron and less than 0.006 of one per cent of titanium, substantially all of the iron present being in the ferric state.

8. A glass having permanent high ultraviolet transmission and containing less than 0.005 of one per cent of total iron and less than 0.008 of one per cent of titanium, substantially all of the iron present being in the ferric state.

9. A glass having permanent high ultraviolet transmission and containing less than 0.003 of one per cent of total iron and less than 0.006 of one per cent of titanium, substantially all of the iron present being in the ferric state.

HARRISON P. HOOD.